United States Patent [19]
Beitel et al.

[11] Patent Number: 5,150,312
[45] Date of Patent: Sep. 22, 1992

[54] ANIMATION PROCESSOR METHOD AND APPARATUS

[75] Inventors: Bradley J. Beitel, Woodside; Robert D. Gordon, Sunnyvale, both of Calif.

[73] Assignee: International Business Machines Corporation, Armonk, N.Y.

[21] Appl. No.: 367,284

[22] Filed: Jun. 16, 1989

[51] Int. Cl.$^5$ .............................................. G06F 3/14
[52] U.S. Cl. .................................. 395/118; 340/750; 340/799
[58] Field of Search ....................... 364/518, 521, 522; 340/747, 750, 706, 744, 738, 799; 382/41, 56

[56] References Cited

U.S. PATENT DOCUMENTS

| | | | |
|---|---|---|---|
| 4,070,710 | 1/1978 | Sukonick et al. | 364/900 |
| 4,197,590 | 4/1980 | Sukonick et al. | 364/900 |
| 4,509,043 | 4/1985 | Mossaides | 340/721 |
| 4,672,575 | 6/1987 | Stephens | 364/900 |
| 4,679,040 | 7/1987 | Yan | 340/747 |
| 4,710,806 | 12/1987 | Iwai et al. | 358/81 |
| 4,873,585 | 10/1989 | Blantan et al. | 358/335 |
| 4,894,774 | 1/1990 | McCarthy et al. | 364/410 |
| 4,933,879 | 6/1990 | Ando et al. | 364/522 |
| 4,941,193 | 7/1990 | Barnsley et al. | 382/56 |

FOREIGN PATENT DOCUMENTS

| | | |
|---|---|---|
| 0158314 | 4/1984 | European Pat. Off. |
| 017120 | 7/1985 | European Pat. Off. |
| 2105157 | 3/1983 | United Kingdom |

OTHER PUBLICATIONS

"Video Display Processor Simulates Three Dimensions", by K. Guttag et al 8032 Electronic In't vol. 53, No. 25, Nov. 20, 1980.

Primary Examiner—Gary V. Harkcom
Assistant Examiner—Phu K. Nguyen
Attorney, Agent, or Firm—Perman & Green

[57] ABSTRACT

Method and apparatus for generating relative movement between a first image and a second image while avoiding display screen flicker. The method includes a step of copying to a first buffer a portion of a display memory corresponding to a present portion of the second image wherein a first image will first appear. The method further includes the steps of superimposing within the display memory the first image upon the present portion of the second image and copying to a second buffer the portion of the display memory corresponding to the present portion of the second image, including the first image superimposed thereon, and a portion of the display memory corresponding to a next portion of the second image wherein the first image will next appear. The method further includes the steps of erasing the first image from the second buffer by copying the present portion from the first buffer to the second buffer and superimposing, within the second buffer, the first image upon the next portion of the second image. The method includes a further step of copying the second buffer to the display memory such that the first image disappears from the present portion of the second image while simultaneously appearing within the next portion of the second image, thereby avoiding display screen flicker.

12 Claims, 4 Drawing Sheets

ANIMATION PROCESSOR METHOD AND APPARATUS

FIELD OF THE INVENTION

This invention relates generally to the display of images and, in particular, relates to method and apparatus for displaying an animated sequence of graphical images that prevents the occurrence of display screen flicker due to the relative movement of a portion of the image relative to another portion of the image.

BACKGROUND OF THE INVENTION

In a system that displays an animated sequence of images, wherein an image of an object or objects moves relative to an image of other objects, a particular problem relates to the generation of screen flicker. This flicker results from a conventional approach of erasing the object at a first location within a screen memory and redrawing the object at a second location. As the object grows larger and/or more complex in shape the time required to erase and rewrite the individual image pixels increases, resulting in a more pronounced screen flicker effect. The presence of screen flicker is objectionable at least for the reason that it prevents a realistic, flicker-free animation sequence from being displayed.

It is therefore an object of the invention to provide method and apparatus for displaying on a display screen a relative movement of a first object to a second object.

It is another object of the invention to provide method and apparatus for displaying on a display screen a relative movement of a first object to a second object without generating a significant amount of screen flicker.

SUMMARY OF THE INVENTION

The foregoing problems are overcome and the objects of the invention are realized by apparatus and method for displaying relative motion between a first image and a second image A system includes a display memory coupled to a display whereon the first image is displayed to move in relation to the second image. The system further includes a plurality of buffer memories coupled to an animation controller, typically a CPU. The method includes a step of copying to a first buffer a portion of the display memory corresponding to a present portion of the second image wherein the first image will first appear. The method further includes the steps of superimposing within the display memory the first image upon the present portion of the second image and copying to a second buffer the portion of the display memory corresponding to the present portion of the second image, including the first image superimposed thereon, and a portion of the display memory corresponding to a next portion of the second image wherein the first image will next appear. The method further includes the steps of erasing the first image from the second buffer by copying the present portion from the first buffer to the second buffer and superimposing, within the second buffer, the first image upon the next portion of the second image.

The method includes a further step of copying the second buffer to the display memory such that the first image disappears from the present portion of the second image while simultaneously appearing within the next portion of the second image, thereby avoiding display screen flicker.

The first image is generated and stored within a buffer memory, the image including one or more displayable objects surrounded by transparent "zero" pels. The first image is superimposed upon the second image such that the object lies in front of the second image.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF A PREFERRED EMBODIMENT OF THE INVENTION

The following description of the invention is made in the context of an audio/visual application processor implemented on an IBM TM PS/2 TM computer system (IBM and PS/2 are trademarks of the International Business Machines Corporation of Armonk, N.Y.). It should be realized though that the teaching of the invention may be practiced with a number of different types of information processing systems in support of a number of different types of application programs that provide a visual display.

Figure 1:
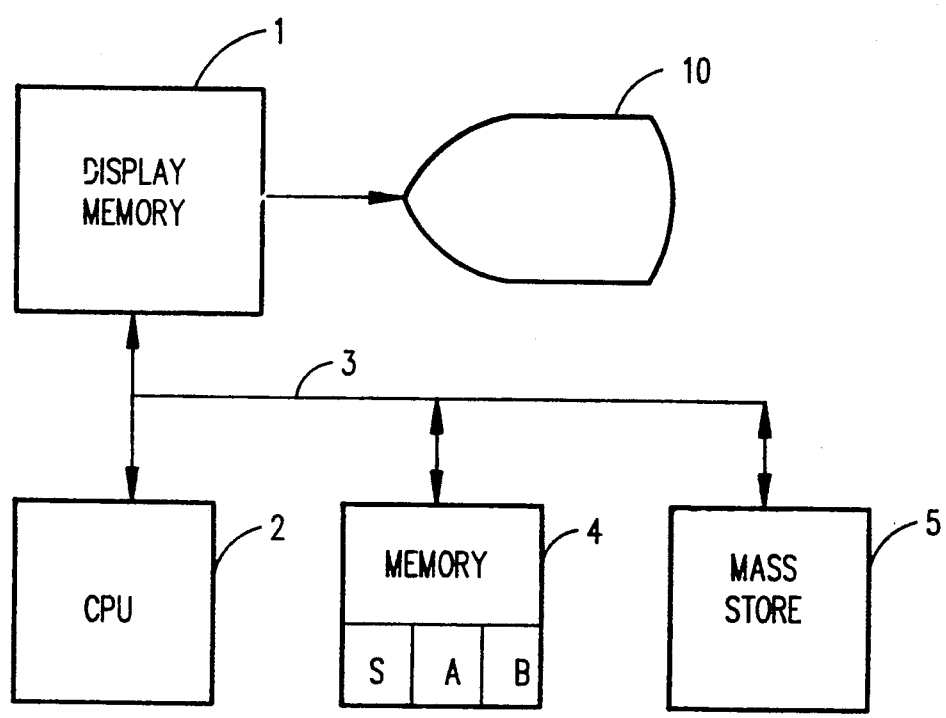
FIG. 1 is a block diagram of an information processing system embodying the invention.
Figure 2A:
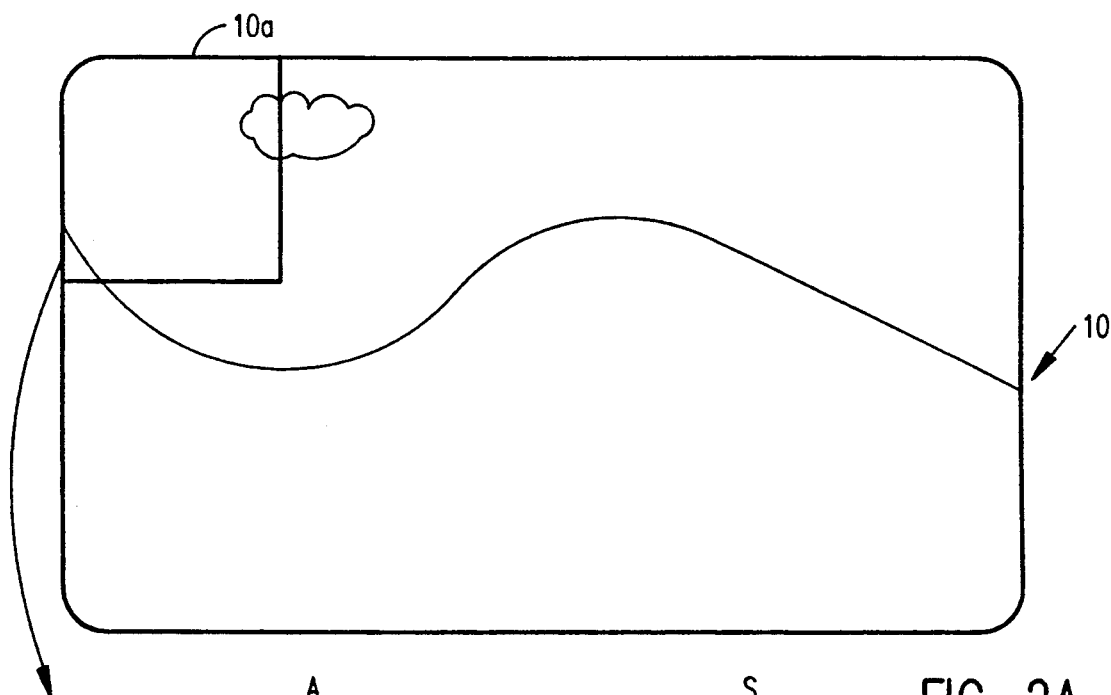
FIGS. 2a-2e illustrate a display screen and the contents of various buffers during the performance of the steps of a method of the invention.

Referring first to FIG. 1 and to FIG. 2a there is shown a visual display screen 10. Associated with display screen 10 is a read/write display memory 1 wherein stored data is read out and displayed on the screen 10 in a conventional manner. An individual or a group of storage locations within the display memory 1 corresponds to individual pixels or pels of the display screen 10. The display memory 1 is coupled to a central processing unit (CPU) 2, the CPU 2 further being coupled via a bus 3 to a main memory 4 wherein instructions are loaded and stored from a mass storage device 5. Certain of the stored instructions control the CPU 2 to perform a graphics display program, including graphical animation sequences, that calls routines comprised of instructions that implement the steps of the method of the invention. The data stored within the display memory 1 may provide information for displaying a monotone or a color image, depending upon the characteristics of the particular system display screen 10. For the example described below display screen 10 displays graphical animation sequences including sequences wherein a first object or image moves relative to a second object, such as a background image. It should be realized that the teaching of the invention is applicable to a wide variety of possible display or animation subjects and sequences.

Referring now to FIGS. 2a-2e and FIG. 3 the method of the invention is described in greater detail. Initially, a region of the display screen 10 is determined wherein an image of an object will first appear on the display screen. This region is referred to as the "present region" in the flowchart block 14 of FIG. 3 in that it is the region wherein the object is currently present, as opposed to a "next region" wherein the object will appear next. In the illustrated example the object is determined to first appear in a region designated 10a. The contents of the display memory 1 corresponding to the region 10a of the display screen 10 are copied to a buffer memory A, as indicated by the arrow. Buffer memory A is preferably a region allocated within main memory 4 for this purpose. Buffer memory A functions as a temporary store that preserves or saves a portion of the screen image within a specific portion of the display screen 10.

Figure 3:
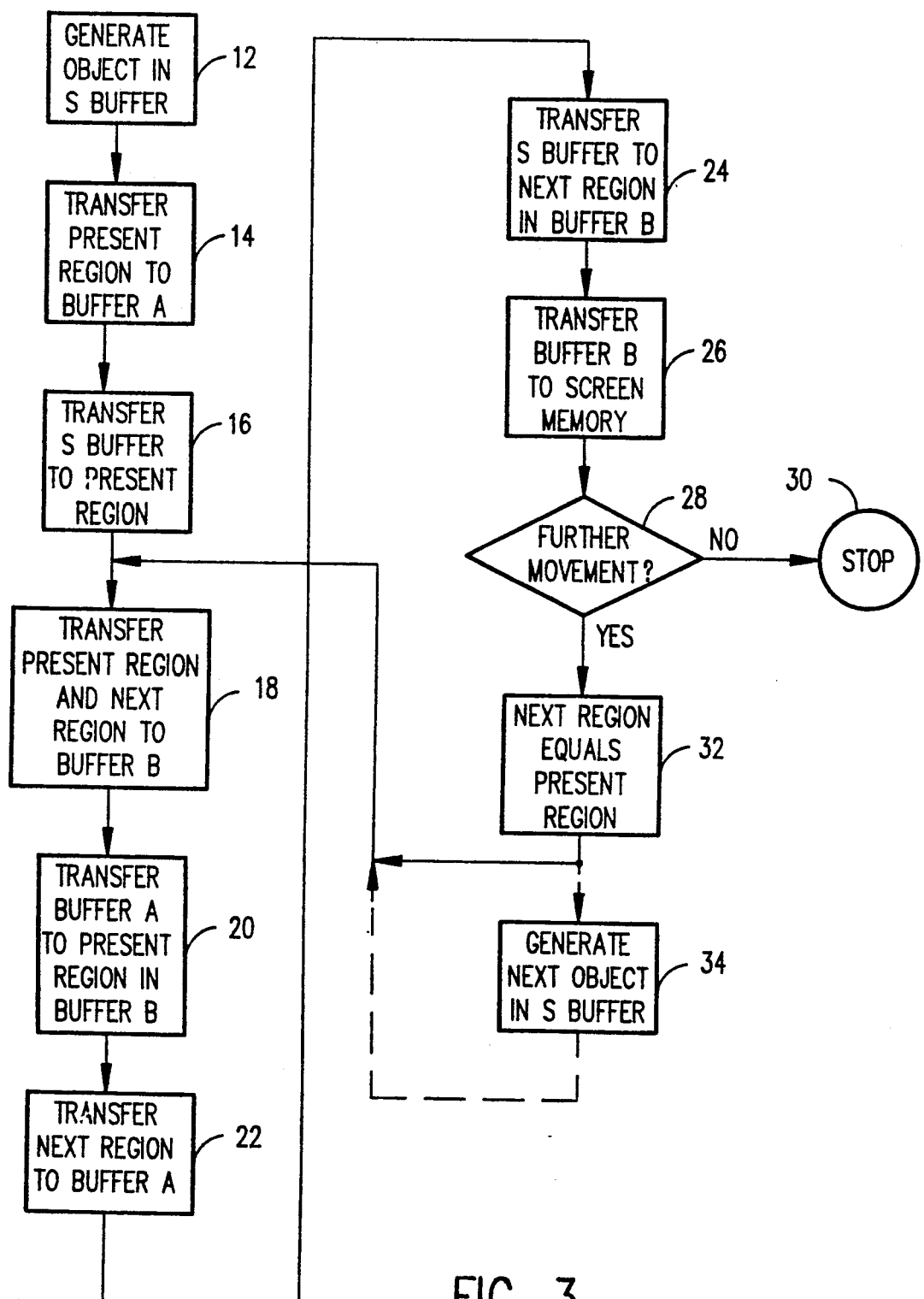
FIG. 3 is a flow chart that illustrates the steps of the method of the invention.

The area of the region 10, that is the number of storage locations required for the buffer memory A, corresponds to that of a Source (S) buffer wherein an image of the object, in this case an aircraft, is initially generated (FIG. 3, block 12). The screen coordinates of the region 10a are thus a function of the size of the S buffer and the desired initial position of the object. The S buffer is also typically an allocated region within the main system memory 4.

Next, the contents of the S buffer are combined with the display memory 1 such that the object appears on the display screen 10 within the region 10a (FIG. 3, block 16). The S buffer contents are initially generated such that the object is surrounded by zero value pels, that is, the region surrounding the object is transparent when superimposed on the display screen 10. This results in the object being displayed and the portion of the display screen 10 background not covered by the object also appearing within the region 10a. The S buffer is combined with and superimposed on the display screen 10 by a process, described below, that is applied to those memory locations within the display memory 1 that correspond to the region 10a. The number of storage locations allocated for the S buffer, and hence the area enclosed by the S buffer, is a function of the size and shape of the object being depicted. The area is sufficient to completely enclose the object outline within a region having the shape of a parallelogram, a shape that is efficiently and rapidly manipulated.

It is noted that each pel has a numeric value. One such value is designated as "transparent". By convention, a value of zero may be so designated. When a foreground image is copied over a background image, the process performing the copy first inspects the value of the foreground pel: if "transparent" it does not copy that pel; if non-transparent, it does. The result is that wherever the foreground image had a transparent pel, the corresponding background pel remains visible at that position in the combined image.

Figure 2B:
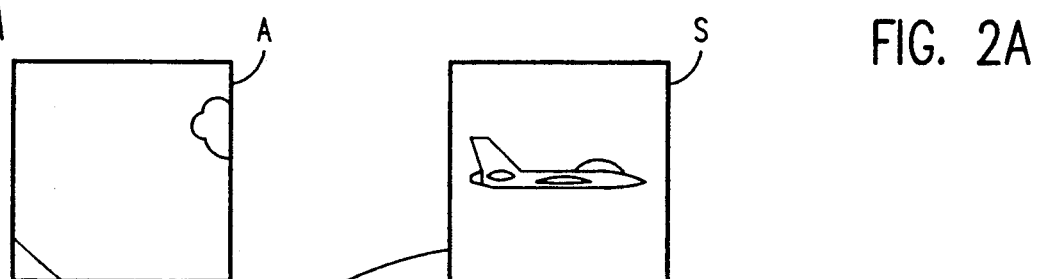
Figure 2B:
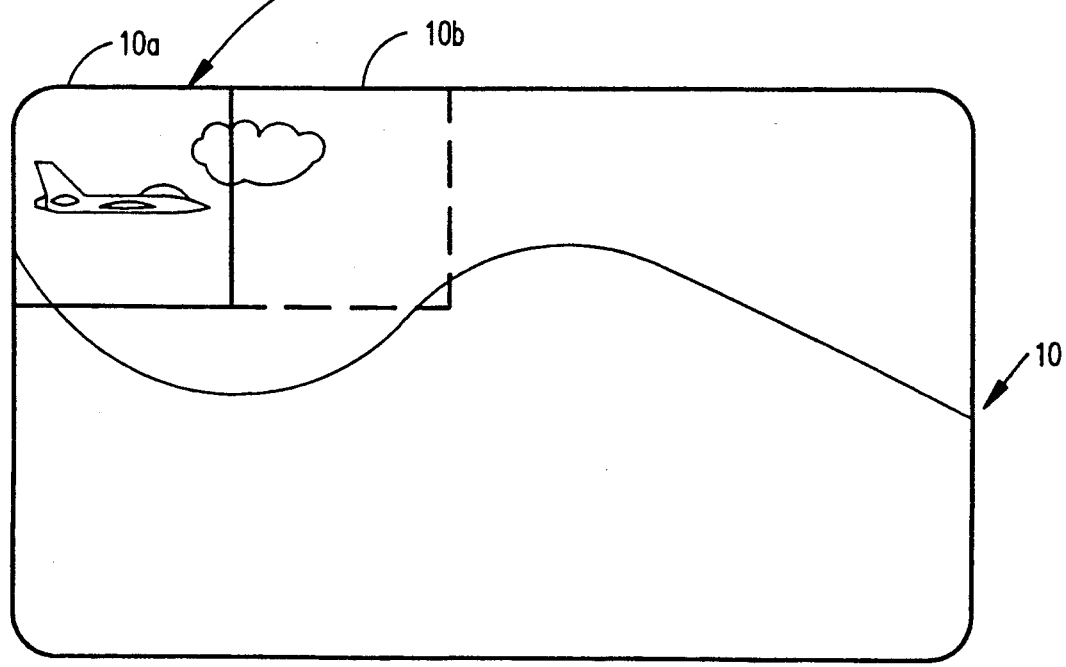
Figure 2C:
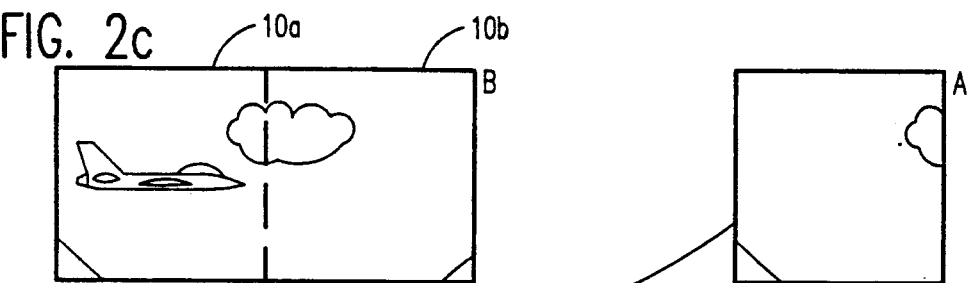

As can be seen in FIG. 2b, a second region 10b of the display screen 10 is delineated, this second region 10b being the region of the display screen 10 wherein the object next appears as it moves relative to the background image.

Figure 2D:
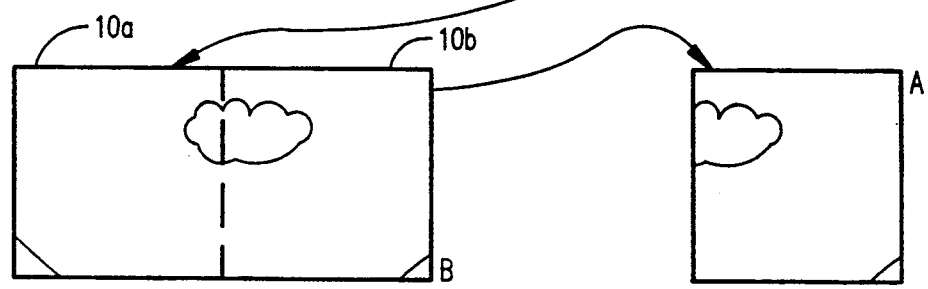

Further in accordance with the invention both of the regions 10a and 10b, the present and the next regions, are copied to a buffer memory B (FIG. 3, block 18). As can be seen the buffer memory B contains the region 10a, including the image of the object, and the adjoining region 10b wherein the object will next appear. The dashed line shown in the center of the buffer memory B is illustrated to differentiate the region 10a from the region 10b; it being realized that such a dashed line would not generally appear in the image or within the buffer. In FIG. 2d the contents of the buffer memory A are transferred to that portion of buffer memory B that corresponds to the region 10a (FIG. 3, block 20). This causes the image of the object to be overwritten and replaced by the corresponding portion of the original background image, thereby effectively erasing the image of the object from the buffer memory B. Next, the contents of the screen memory 1 that correspond to the adjoining region 10b are copied to the buffer memory A to preserve the appearance of the background image before the object is superimposed thereon (FIG. 3, block 22). That is, the original contents of the buffer memory A, corresponding to the image of the region 10a before the appearance of the object, are written back to the region 10a within buffer memory B and are replaced by the image corresponding to the adjoining region 10b.

Figure 2E:
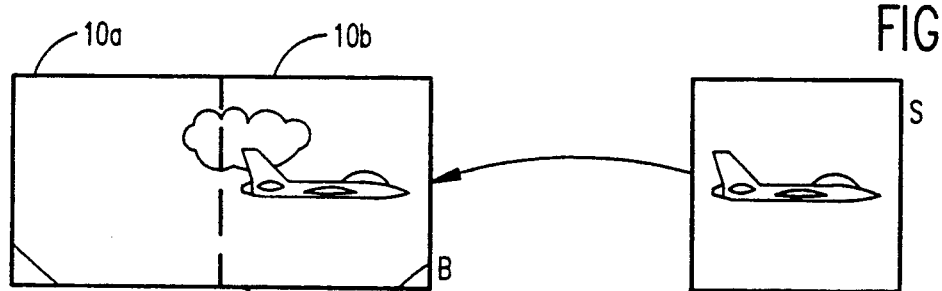
Figure 2E:
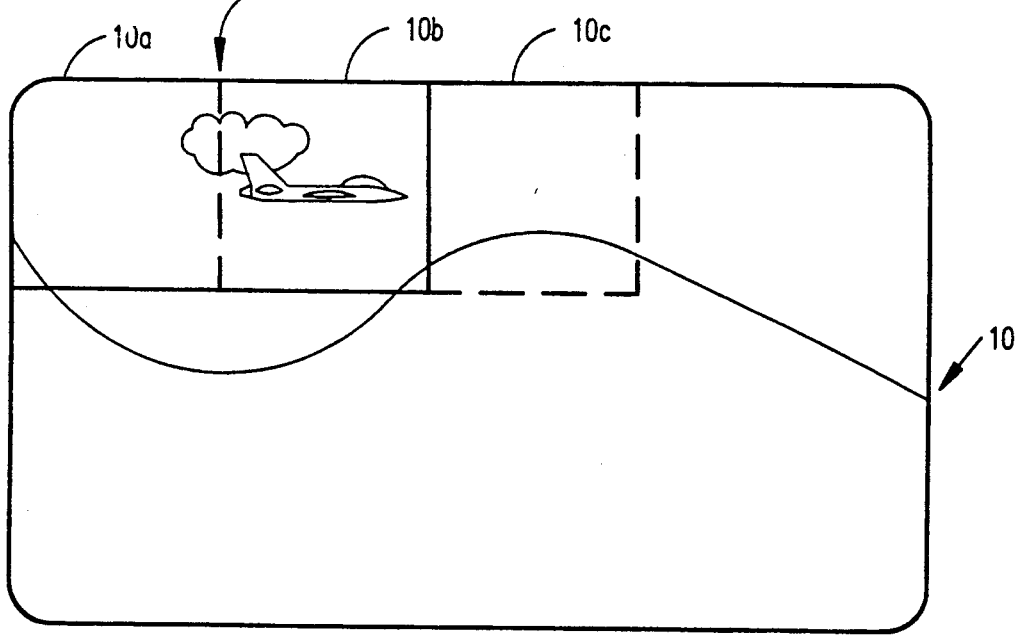

In FIG. 2e it can be seen that the contents of the S buffer, that is the object, are combined with the buffer memory B within the portion corresponding to the region 10b (FIG. 3, block 24). As before, the object pels overwrite the background portion of the image while the pels surrounding the object are transparent. This results in the object appearing to lie in front of the original portion of the image within the region 10b.

Next, the content of the buffer memory B is copied to the display memory 1 such that the regions 10a and 10b are both replaced by the contents of the B buffer (FIG. 3, block 26). Comparing FIG. 2e to FIG. 2b it can be seen that this operation results in an apparent movement of the object, relative to the borders of the display screen and to the background image objects, from the region 10a to the region 10b. Furthermore, it can be appreciated that this movement occurs without generating screen flicker in that writing the buffer B image to the screen memory 1 causes the object to be totally erased from the region 10a while simultaneously being written to the region 10b. The buffer B contents are preferably written in a conventional manner to the screen memory 1 during a time that the screen is blanked during vertical retrace.

It is next determined if the object is to continue to move across the display screen (FIG. 3, block 28). If not the method halts (FIG. 3, block 30). If further movement is desired a third region 10c is delineated, the region 10c being that region wherein the object is next to appear. Region 10b becomes associated with the present region and region 10c with the next region (FIG. 3, block 32). At this time the regions 10b and 10c are copied to the buffer memory B as previously described in relation to FIG. 2c (FIG. 3, block 18). The method thereafter repeats the steps shown in FIGS. 2c, 2d and 2e as the object is moved across the display screen 10.

It is noted that in some embodiments of the invention that the content of the S buffer is replaced with a slightly different image between iterations of the loop. The example shows an aircraft flying across the screen at the same distance from the viewer. For such an animation sequence the originally generated S buffer is used repetitively. However, if the animation sequence were of a bird approaching from a distance it can be realized that in each iteration the bird would present a slightly larger image, and the orientation of the wings would differ. This animation sequence requires multiple "next" images of the bird to be generated with all of the different wing positions and of varying sizes. The method as previously described is used, with the added step shown in block 34 that the "next" image of the bird is generated within or copied to the S buffer.

While a presently preferred embodiment of the invention has been described above it will be realized by those having skill in the art that the teaching of the invention may be embodied in a number of different types of hardware embodiments, including a dedicated animation coprocessor having local buffer memories or by special purpose hardware embodied in, by example, a gate array. Also, certain steps of the method may be combined or accomplished in other than the order described while still obtaining the desired result.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. In a system having display memory means coupled to display means whereon a first image is displayed to move in relation to a second image, a method for creating relative movement between the first and the second images comprising the steps of:

copying to a first buffer means a portion of the display memory means corresponding to a present portion of the second image wherein the first image will first appear;

superimposing within the display memory means the first image upon the present portion of the second image;

copying to a second buffer means the portion of the display memory means corresponding to the present portion of the second image, including the first image superimposed thereon, and a portion of the display memory means corresponding to a next portion of the second image wherein the first image is required to next appear;

erasing the first image from the second buffer means by copying the present portion from the first buffer means to the second buffer means, thereby overwriting the first image stored within the second buffer means;

superimposing, within the second buffer means, the first image upon the next portion of the second image; and copying the second buffer means to the display memory means to cause the first image to disappear from the present portion of the second image and to appear within the next portion of the second image.

2. A method as set forth in claim 1 and comprising an initial step of generating within a source buffer means a representation of the first image, the first image being surrounded by transparent pels.

3. A method as set forth in claim 2 wherein the first and the second steps of superimposing are accomplished by combining the contents of the source buffer means with the contents of the display memory means and with the contents of the second buffer means.

4. In a system having display memory means coupled to display means whereon a first image moves in relation to a second image, a method for creating relative movement between the first and the second images comprising the steps of:

(a) generating a representation of the first image and storing same in a source buffer memory means;

(b) copying a first portion of the second image from the display memory means to a first buffer memory means;

(c) combining the representation of the first image from the source buffer memory means with storage locations of the display memory means corresponding to the first portion of the second image thereby including the first image with the first portion of the second image;

(d) copying the first portion of the second image, including the first image, from the display memory means to a first portion of a second buffer memory means;

(e) copying a second portion of the second image from the display memory means to a second portion of the second buffer memory means, the second portion of the second image being that portion of the second image wherein the first image is required to next appear;

(f) copying from the first buffer memory means to the first portion of the second buffer memory means the first portion of the second image thereby overwriting the representation of the first image within the first portion of the second buffer memory means;

(g) combining the representation of the first image from the source buffer memory means with the second portion of the second buffer memory means thereby including the representation of the first image with the second portion of the second image stored therein; and (h) copying the first and the second portions of the second buffer memory means to the corresponding portions of the screen memory means such that the first image appears to move from the first portion to a second portion of the display screen.

5. A method as set forth in claim 4 and including the steps of identifying the second portion of the second image with the first portion of the second image and repeating the steps (d) through (h) to create further relative movement between the first and the second images.

6. A method as set forth in claim 4 wherein in steps (c) and (g) the first image is combined by being superimposed upon the second image.

7. A method as set forth in claim 6 wherein the step of generating generates a representation of the first image surrounded by transparent background.

8. A method as set forth in claim 7 wherein a size of the first and the second image portions corresponds to a size of the first image and the surrounding transparent background.

9. A method as set forth in claim 5 where the step of generating generates a plurality of representations of the first image and includes a step of replacing the contents of the source buffer means with a different one of the representations before repeating steps (d) through (h).

10. In a data processing system comprising display memory means coupled to display means, apparatus for generating a relative motion between a first displayed image and a second displayed image, comprising:

first buffer memory means for storing a representation of the first image;

second buffer memory means for storing a first portion of the display memory means corresponding to the second image;

third buffer memory means for storing the first portion of the display memory means corresponding to the second image having the first image combined therewith and also for storing a second portion of the display memory means corresponding to the second image at a location where the first image is required to be next combined; and control means, coupled to the display memory means and to the aforesaid plurality of buffer memory means, for (a) copying the first portion of the display memory means to the second buffer memory means, for (b) combining the contents of the first buffer memory means with the first portion of the display memory means, for (c) copying the first and the second portions of the display memory means to a first region and to a second region, respectively, of the third buffer memory means, the first portion including the combined contents of the first buffer memory means, for (d) copying the second buffer memory means to the first region of the third buffer memory means, thereby overwriting the representation of the first image stored therein, for (e) copying the second region of the third buffer memory means to the second buffer memory means, for (f) combining the first buffer memory means with the second portion of the third buffer memory means to cause the representation of the first image to transfer from the first region to the second region and, for (g) copying the third buffer memory means to the display memory means thereby causing an apparent relative movement of the first displayed image relative to the second displayed image.

11. A method for creating relative movement between a first image and a second image, comprising the steps of:

copying, from a display memory means to a first buffer means, image data representing a first two-dimensional portion of the second image;

combining, within the display memory means, image data representing the first image with the image data that represents the first two-dimensional portion;

copying, from the display memory means to a second buffer means, the image data representing the first two-dimensional portion having the first image combined therewith, and also image data representing a second two-dimensional portion of the second image;

copying the image data stored in the first buffer means to the second buffer means so as to overwrite the portion of the image data that represents the first two-dimensional portion;

combining, within the second buffer means, the image data representing the first image with the image data that represents the second two-dimensional portion; and copying the image data from the second buffer means to the display memory means so as to cause the first image to disappear from first two-dimensional portion and appear within the second two-dimensional portion.

12. A method as set forth in claim 11 and comprising an initial step of generating within a source buffer means a representation of the first image, the first image being surrounded by transparent pels.

* * * * *